United States Patent [19]
Lenhardt, Sr.

[11] 4,078,874
[45] Mar. 14, 1978

[54] APPARATUS FOR CONVEYING GROUND CHEESE

[75] Inventor: Roy A. Lenhardt, Sr., Fond du Lac, Wis.

[73] Assignee: DEC International, Inc., Madison, Wis.

[21] Appl. No.: 741,662

[22] Filed: Nov. 15, 1976

Related U.S. Application Data

[63] Continuation-in-part of Ser. No. 639,356, Dec. 10, 1975, abandoned.

[51] Int. Cl.² .................................................. B29F 3/00
[52] U.S. Cl. ........................... 425/72 R; 425/192 R; 425/202; 425/309; 425/377; 425/382 R; 426/516
[58] Field of Search ........................ 83/115, 116, 81; 264/142, 148; 241/82.7; 425/306, 307, 309, 311, 313, 316, 377, DIG. 2, DIG. 20, 202, 72 R, 192 R, 464; 426/516, 518, 513

[56] References Cited

U.S. PATENT DOCUMENTS

| | | | |
|---|---|---|---|
| 916,827 | 3/1909 | Bangs | 425/202 X |
| 3,025,564 | 3/1962 | Voigt | 264/142 X |
| 3,578,740 | 5/1971 | Redding et al. | 425/377 X |
| 3,778,522 | 12/1973 | Strommer | 426/516 X |
| 3,801,248 | 4/1974 | Fischer | 264/148 X |
| 3,976,799 | 8/1976 | Kelly, Jr. et al. | 426/513 X |

*Primary Examiner*—Francis S. Husar
*Assistant Examiner*—Mark Rosenbaum
*Attorney, Agent, or Firm*—Andrus, Sceales, Starke & Sawall

[57] ABSTRACT

An apparatus for conveying ground cheese comprising a hopper to receive the ground cheese and having an auger adapted to extrude the cheese through a multiplicity of holes in a die plate. Two sets of rotating blades are located in a housing outwardly of the die plate and act to cut the extruded cheese into a plurality of small particles or plugs. Air is supplied to the lower end of the housing and the cut particles are suspended in the air stream and discharged from the upper end of the housing.

10 Claims, 6 Drawing Figures

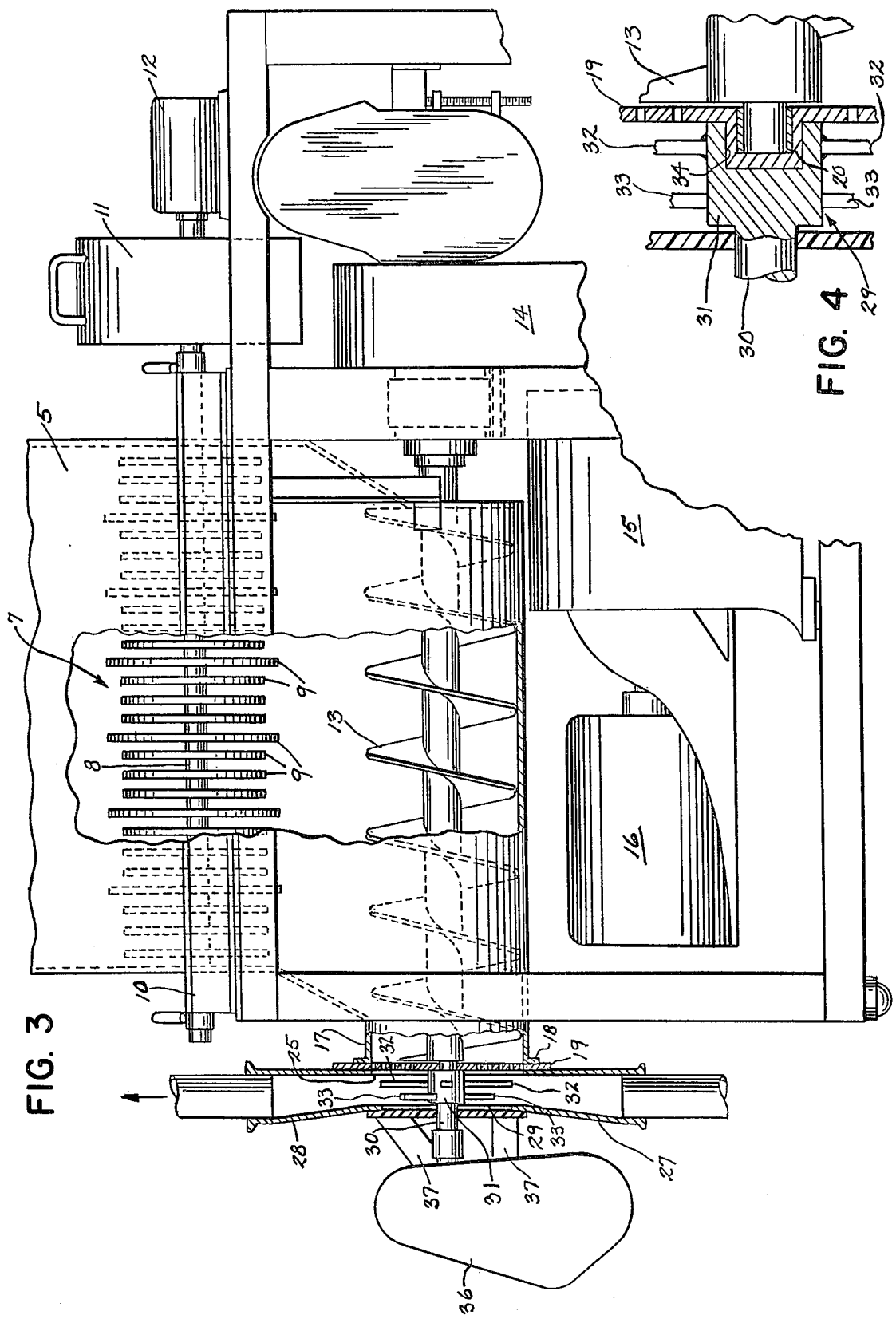

4,078,874

APPARATUS FOR CONVEYING GROUND CHEESE

This application is a continuation-in-part of application Ser. No. 639,356, filed Dec. 10, 1975 now abandoned.

BACKGROUND OF THE INVENTION

In the manufacture of processed cheese, fresh cheese curd and various types of ground cheese are blended together and subsequently heated or cooked to pasturize the cheese. Fresh cheese curd is not particularly cohesive so that the curds will not tend to matt together and the curd can be conveyed by conventional pneumatic systems. However, particles of ground cheese are extremely cohesive and tend to matt together and bridge across pneumatic conveying equipment.

Because of this, pneumatic conveying of ground cheese has not been satisfactorily practiced in the past. Therefore, the practice has been to either transport the ground cheese manually through use of shovels and carts, or to transport it by means of belt conveyors or auger conveying systems.

The use of belt conveyors for conveying ground cheese has certain disadvantages in that the ground cheese tends to adhere to the belt and particles of cheese may pass around the rollers at the ends of the conveyor onto the underside of the belt. The cheese particles adhering to the underside of the belt can contaminate components of the conveying system. It is necessary in the cheese making practice to clean all parts of the operating equipment after each production run, and it is extremely difficult to clean the cheese particles from certain components of the belttype conveyor, such as bearings. Furthermore, a belt type conveyor is not versatile in operation in that its route is fixed and additional belt conveyors must be employed to deliver the ground cheese to various locations.

Auger conveying systems have similar disadvantages to that of belt conveyor systems in that they are difficult to clean and are not readily adapted to a change of route nor the delivery of cheese to multiple locations.

SUMMARY OF THE INVENTION

The invention relates to an improved pneumatic apparatus for conveying ground cheese. In accordance with the invention, the apparatus comprises a hopper which contains the ground cheese and an auger is located in the lower end of the hopper and acts to extrude the ground cheese horizontally through a die plate. A housing is positioned outwardly of the die plate and an air stream is directed upwardly through the housing. Two sets of rotating blades, disposed axially of each other, are mounted in the housing. The blades immediately adjacent the die plate act to cut the extruded cheese into short lengths, while the second set of blades located outwardly from the die plate acts to keep the particles of cheese in suspension until the particles can be picked up and carried along in the air stream.

The apparatus of the invention enables ground cheese to be successfully conveyed in an air stream, even though the ground cheese is extremely cohesive and tends to matt together and bridge across conveying tubes and other conveying equipment.

The apparatus can be readily cleaned in place by conventional techniques, thereby substantially reducing the time and labor involved in cleaning the apparatus after production runs. As the apparatus is mounted on a mobile frame, it can be moved throughout the cheese making plant. Furthermore, the pneumatic conveying conduits are flexible so that the ground cheese can be delivered to various sites in the plant as desired.

Other objects and advantages will appear in the course of the following description.

DESCRIPTION OF THE DRAWINGS

The drawings illustrate the best mode presently contemplated of carrying out the invention.

In the drawings:

FIG. 3 is a vertical section of the apparatus;

FIG. 4 is an enlarged fragmentary vertical section showing the attachment of the end of the auger to the die plate;

DESCRIPTION OF THE PREFERRED EMBODIMENT

Figure 1:
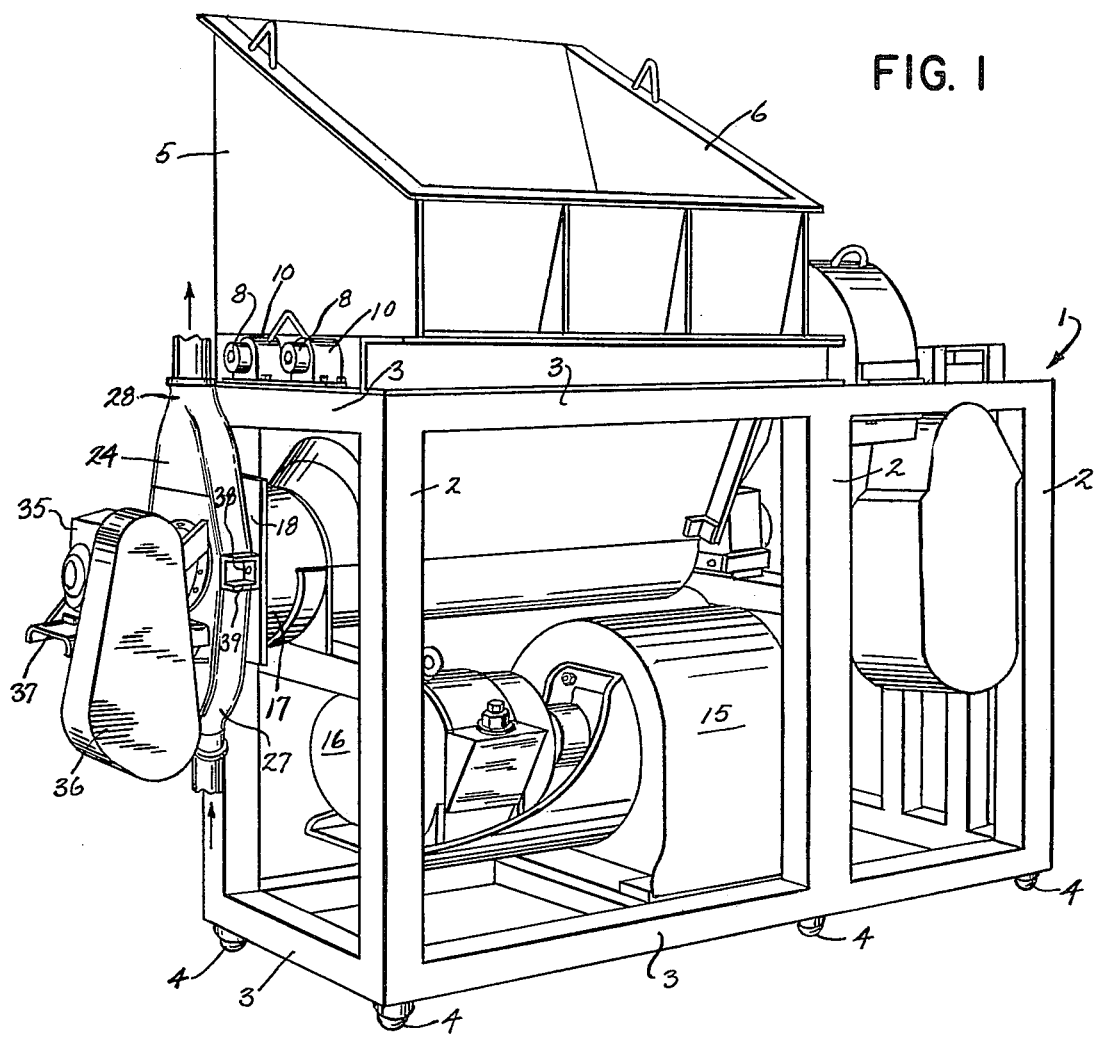
FIG. 1 is a perspective view of the apparatus of the invention.

FIGS. 1-4 illustrate an aparatus for conveying ground cheese which includes a frame 1 composed of a series of vertical supports 2 which are connected by horizontal frame 3. Casters 4 are attached to the lower end of the frame and enable the frame to be moved over the ground.

Mounted on the frame is a hopper 5 having an open top 6 into which the cheese is introduced. In the apparatus illustrated in the drawings, a cheese grinding mechanism 7 is located in the upper end of the hopper and acts to grind the cheese being introduced into the open top 6. In other installations, a separate grinding mechanism may be used and the ground cheese is then introduced into the hopper.

The grinding mechanism 7 is a standard type which includes a pair of generally parallel horizontal shafts 8 each having a series of radially extending intermeshing cutting discs of knives 9 which act to grind or comminute the cheese as it is introduced between the rotating discs. The corresponding ends of the shaft 8 are journalled within bearing blocks 10 at one end of the hopper, while the opposite ends of the shafts 8 are connected to a gear box 11 which is driven by motor 12. With this construction, operation of the motor 12 acts to rotate the shafts to thereby grind the cheese.

Located within the lower end of the hopper is an auger 13 and one end of the auger shaft extends outwardly of the end wall of the hopper and is connected by a chain drive 14 to a transmission 15 which is driven by a motor 16.

Figure 2:
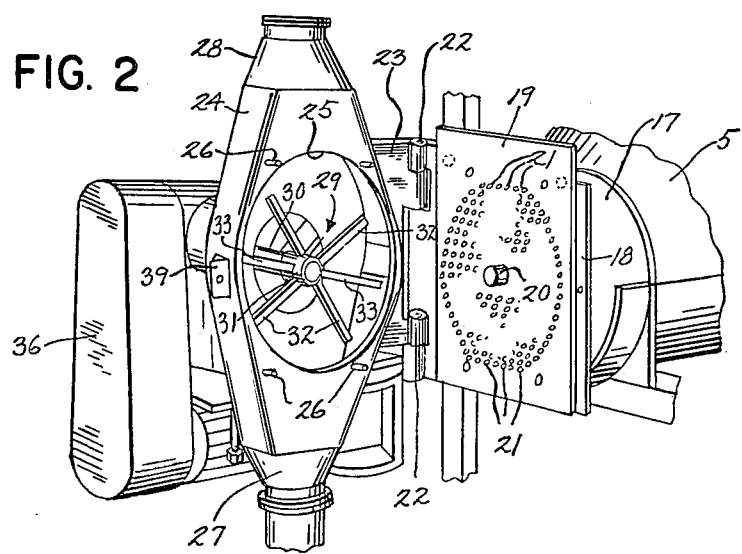
FIG. 2 is a perspective view showing the pneumatic housing in the open position.

Operation of the auger acts to convey the cheese toward an outlet 17 in the hopper 5. As shown in FIG. 2, the outlet 17 is bordered by an outwardly extending flange 18 and the peripheral edge of a die plate 19 is secured to the flange by bolts. The center of the die plate is provided with a cup-shaped housing 20 which houses a bearing assembly for journalling the end of the auger shaft 13.

The auger acts to extrude the ground cheese through a series of holes or openings 21 in the die plate 19 and the cheese being discharged from the die plate will be in the form of rods or strings.

Hinged to the flange of the outlet 17 by hinges 22 is a support plate 23 and a housing 24 is supported by the plate 23. As best shown in FIG. 2, the central portion of the housing 24 is provided with an opening 25 which communicates with the die plate 19. The housing 24 is aligned with the outlet 17 of the hopper 5 by means of a series of aligning pins or dowels 26 which extend outwardly from the housing and are received within suitable openings in the die plate.

The lower end of the housing 24 defines an air inlet 27 which is connected to suitable air blowers, while the upper end of the housing defines an outlet 28 through which the chesse particles are conveyed to processing equipment.

The ground cheese being extruded through the holes in the die plate is cut into short lengths by a cutting assembly 29 located within the housing. The cutting assembly 29 includes a shaft 30 having an enlarged hub 31 which carries two sets of rotating blades 32 and 33. The blades 32 are located immediately adjacent the die plate and act to cut the strings or rods of ground cheese into short lengths, while the set of blades 33 is located axially of the first set and act to keep the short plugs of cheese in suspension within the housing until the particles can be swept up in the airstream passing through the housing.

The inner end of the hub is provided with a recess 34 which is adapted to receive the cup-shaped housing 20 on die plate 19, when the housing 24 and plate 23 are in the closed position.

The blades 32 and 33 are rotated by means of a motor 35 which operates through a speed reduction unit, indicated generally by 36, that is connected to the outer end of the shaft. The motor 35 and speed reducing unit 36 are mounted on a bracket 37 secured to the outer surface of the housing. As previously noted, the housing is adapted to swing to an open position for cleaning or removal of the die plate 19 and can be locked in the closed position by bolt 38 which connects a bracket 39 on the housing 24 to the flange 18 bordering the outlet 17 in the hopper, as shown in FIG. 1.

In operation, the cheese is introduced into the upper end of the hopper 5, and is ground by the grinding mechanism 7. The ground cheese is then conveyed by the auger 13 and extruded through the holes 21 in the die plate 19. The extruded cheese is then cut into short lengths by the rotating blades 32, and the blades 33 act to keep the short lengths or particles of cheese in suspension in order that the particles may be picked up in the stream of air, which is moving upwardly through the housing, and conveyed to the destination.

The blades 33 are important to the invention in that they agitate or maintain the particles in suspension so that they will not stick or matt together and bridge across the housing. Similarly, upward air flow is also necessary because as the particles are cut, they are initially cushioned on the upwardly moving stream of air until their direction can be reversed and they move upwardly with the air stream. This again acts to prevent matting of the ground cheese particles and bridging across the housing and other conveying components.

While the drawings show four blades 32 and two blades 33 the number and position of the blades of each set is not critical.

Figures 5, 6:
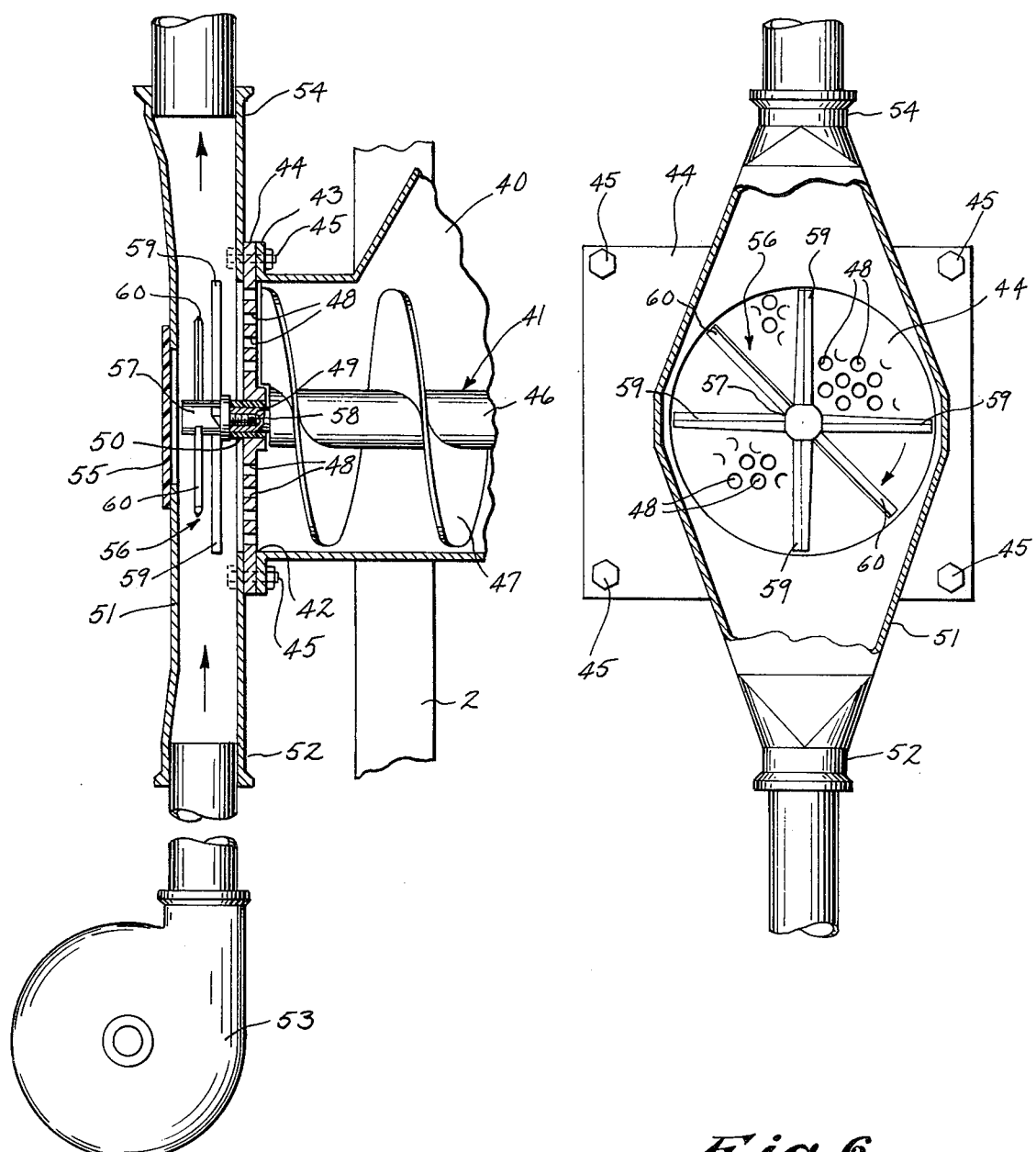
FIG. 5 is a fragmentary vertical section of a modified form of the apparatus.
FIG. 6 is an en view of the apparatus of FIG. 5, with parts broken away.

FIGS. 5 and 6 illustrate a modified form of the invention which includes a hopper 40, similar in construction to hopper 5 of the first embodiment, and an auger 41 is mounted in the lower end of the hopper and the auger is driven by a mechanism similar to that described in the first embodiment. A grinding mechanism, not shown, but similar in construction and function to grinding mechanism 7, is located in the upper end of the hopper and acts to grind or comminute the cheese between rotating discs and the ground cheese is then conveyed by the auger toward the outlet 42 in the hopper 40. As shown in FIG. 6, the outlet 42 is bordered by an outwardly extending flange 43 and the peripheral edge of a die plate 44 is secured to the flange by bolts 45.

The auger includes a shaft 46 and a spiral flight 47 which is attached to the shaft, and the end of the flight terminates adjacent the die plate 44. Operation of the auger moves the cheese toward the die plate and extrudes the ground cheese through a series of holes or openings 48 in the plate.

As shown in FIG. 5, the end 49 of the auger shaft is journaled within a nylon bushing 50 mounted within a central flanged opening in the die plate 44.

A housing 51, similar in construction to housing 24, is attached to the die plate 44, and the housing includes a lower inlet 52 connected to a blower 53 or other air moving device, and an upper air outlet 54. The central portion of the housing 51 is provided with a transparent window 55 so that the operator can view the flow of the cheese particles through the housing.

Located within the housing is a cutting unit 56, including a central hub 57, and the hub carries a stud 58 which is threaded in a central bore in the end 49 of the auger shaft. With this construction, the hub 57 of the cutting unit 56 is connected directly to the auger and will rotate with the auger.

Mounted on the hub are two sets of rotating blades 59 and 60. The blades 59 are located immediately adjacent the die plate and act in a manner similar to blade 32 to cut the extruded strings or rods of ground cheese into short lengths. The second set of blades 60 is located axially of the first set and serves to keep the short plugs of cheese in suspension in the housing until the particles can be swept up in the vertically moving air stream passing through the housing.

The blades 59 and 60 are illustrated as having sharpened leading edges, but the particular cross sectional configuration of the blades is not critical to the invention.

The construction of FIGS. 5 and 6 is a simplified structure in which the drive for the auger is utilized to operate the cutting mechanism.

The apparatus of the invention enables ground cheese to be conveyed by a pneumatic system and overcomes the tendency of the ground cheese particles to matt together and bridge across the conveying apparatus. The pneumatic conveying system is versatile in that the conveying conduits can be directed to different destinations to convey the ground cheese to various processing sites. Furthermore, the unit can be readily cleaned in place with a minimum of time and labor.

Various modes of carrying out the invention are contemplated as being within the scope of the following claims particularly pointing out and distinctly claiming the subject matter which is regarded as the invention.

I claim:

1. An apparatus for conveying ground cheese, comprising a hopper having an inlet to receive cheese and having an outlet, an auger located within the lower portion of the hopper and disposed to convey the cheese toward said outlet, a die plate disposed across the outlet and having a plurality of holes therein, a housing removably connected to the hopper and having a vertical air passage therein and having a laterally extending opening providing communication between the passage and the discharge side of the die plate, air inlet means connected to the lower end of said passage and communicating with a source of air under pressure whereby the air flows upwardly through said passage, air outlet means connected to the upper end of said passage, and cutting means disposed within the passage, said cutting means comprising a shaft and a first set of rotating blades mounted on the shaft and disposed adjacent the discharge side of the die plate, said first set of blades disposed to cut the cheese being extruded through the holes in said die plate into particles, said cutting means also including a second set of rotating blades mounted on the shaft and located axially from said first set in a direction away from the die plate, said second set of blades serving to agitate the cut particles to enable the particles to be picked up in the air flowing through said passage and prevent matting of said particles.

2. The apparatus of claim 1, wherein the auger includes a second shaft axially aligned with the shaft of the cutting means, one of said shafts having a recess to receive an end of the other shaft.

3. The apparatus of claim 2, and including pivot means pivotally connecting said housing to said hopper whereby the housing can be moved between an open and a closed position, the end of said other shaft being disposed within said recess when the housing is in the closed position.

4. The apparatus of claim 1, wherein said first set includes a greater number of blades than said second set.

5. The apparatus of claim 1, wherein the blades of the second set are displaced angularly from the blades of the first set and are operable to rotate in the same direction as the first set of blades.

6. The apparatus of claim 1, and including cheese grinding means disposed within the hopper adjacent the inlet to grind the cheese.

7. The apparatus of claim 1, wherein the upper and lower end portions of the housing are tapered and the central portion of the housing has a greater cross-section area than said end portions, said cutting means being disposed within said central portion, said upper end portion being connected to said air outlet means and said lower end portion being connected to said air inlet means.

8. An apparatus for conveying ground cheese, comprising a container having an inlet to receive cheese and having an outlet, an auger located within the container and including a shaft, drive means connected to said shaft for driving the auger, a die plate disposed across the outlet and having a plurality of holes therein, said auger being operable to extrude the cheese through the holes in the die plate, a housing connected to the container and having a vertical air passage therein and having a laterally extending opening providing communication between the vertical passage and the discharge side of the die plate, said housing having an air inlet at its lower end and having an air outlet at its upper end, blower means connected to the air inlet for moving a stream of air vertically through said passage, cutting means disposed within said passage and comprising a hub and a first set of rotating blades mounted on the hub and disposed adjacent the discharge side of the die plate, said first set of blades disposed to cut the cheese extruded through the holes in the die plate into particles, said cutting means also including a second set of rotating blades mounted on the hub and located axially from the first set in a direction away from the die plate, said second set of blades serving to agitate the cut particles to enable the particles of be picked up in the vertically moving air flowing through the passage and prevent matting of the particles, and means interconnecting the auger shaft with said hub, whereby rotation of the auger will drive said cutting means.

9. The apparatus of claim 8, and including journaling means carried by the die plate for journaling the auger shaft for rotation.

10. The apparatus of claim 8, wherein the die plate is provided with a central opening and an end of the auger shaft is journaled within said opening, said hub being connected to the end of the auger shaft.

* * * * *

UNITED STATES PATENT AND TRADEMARK OFFICE
CERTIFICATE OF CORRECTION

PATENT NO. : 4,078,874
DATED : March 14, 1978
INVENTOR(S) : ROY A. LENHARDT, Sr.

It is certified that error appears in the above-identified patent and that said Letters Patent are hereby corrected as shown below:

Column 1, Line 35, Cancel "belttype" and substitute therefor ---belt type---, Column 2, Line 23, Cancel "en" and substitute therefor ---end---, Column 2, Line 28 Cancel "aparatus" and substitute therefor ---apparatus---, Column 3, Line 15, Cancel "chesse" and substitute therefor ---cheese---, Column 6, Line 31, CLAIM 8, Cancel "of" and substitute therefor ---to---

Signed and Sealed this

Twenty-second Day of August 1978

[SEAL]

Attest:

RUTH C. MASON
Attesting Officer

DONALD W. BANNER
Commissioner of Patents and Trademarks